United States Patent [19]

Tanaka

[11] Patent Number: 5,648,056
[45] Date of Patent: Jul. 15, 1997

[54] FULLERENE COMPOSITE

[75] Inventor: Shun-ichiro Tanaka, 1-35-12, Hongo, Seya-ku, Yokohama-shi, Kanagawa-ken, Japan

[73] Assignees: Research Development Corporation of Japan, Saitama-ken; Shun-ichiro Tanaka, Kanagawa-ken, both of Japan

[21] Appl. No.: 428,313

[22] Filed: Apr. 25, 1995

[30] Foreign Application Priority Data

Apr. 28, 1994 [JP] Japan .................................... 6-092381

[51] Int. Cl.$^6$ ................ D01F 9/12; C01B 31/00
[52] U.S. Cl. .................... 423/445 B; 423/447.2; 423/DIG. 40; 428/367
[58] Field of Search ............. 423/445 B, 447.2, 423/DIG. 39, DIG. 40; 428/367, 408

[56] References Cited

FOREIGN PATENT DOCUMENTS

WO92/04279  3/1992  WIPO .

OTHER PUBLICATIONS

T.W. Ebbesen et al., "Large-scale synthesis of carbon nanotubes," Nature, vol. 358, Jul. 16, 1992, pp. 220–222.

Saito, Y., et al. "Growth and Structure of Graphitic Tubules . . ." Chem. Phys. Lett., vol. 204, #3–4, pp. 277–282 (1993).

Ando, Y. "Carbon Nanotubes at As–Grown Top Surface of Columnar Carbon Deposit," Japan Journal of Applied Physics, vol. 32 (1993), pp. L1342–L1345.

Ando, Y. "Preparation of Carbon Nanotubes by Arc–Discharge Evaporation", Japan Journal of Applied Phys; vol. 32 (1993), pp. L107–L109.

*Primary Examiner*—Michael Lewis
*Assistant Examiner*—Peter T. DiMauro
*Attorney, Agent, or Firm*—Finnegan, Henderson, Farabow, Garrett & Dunner, L.L.P.

[57] ABSTRACT

A fullerene composite comprises a matrix formed of ultrafine fullerene such as, for example, $C_{60}$ crystallite having diameters in the range of from 5 to 50 nm and a reinforcing member formed of a mixture consisting of carbon nanotubes, carbon nanocapsules, and inevitable indeterminate carbonaceous impurities and incorporated in the matrix. The amount of the reinforcing member incorporated in the matrix is in the range of from 15 to 45% by weight based on the amount of the matrix. Owing to the use of the reinforcing member which contains carbon nanotubes and carbon nanocapsules, the produced fullerene composite is enabled to acquire improved mechanical strength and resistance to deformation, and the wide applicabilities are endowed with fullerene composites.

7 Claims, 2 Drawing Sheets

FULLERENE COMPOSITE

BACKGROUND OF THE INVENTION

1. Field of the Invention

This invention relates to a fullerene composite having a fullerene represented by $C_{60}$ as a matrix thereof.

2. Description of the Related Art

The fullerene represented by the $C_{60}$ molecule, buckminsterfullerene, has a highly symmetrical structure where the carbon atoms are arranged like a soccer ball shape with equivalent covalent bond. The $C_{60}$ molecules are packed into fcc structure interacting through van der Waals forces, which exhibits such mechanical properties as plastic deformation and work hardening.

The fullerene molecule is distinct from conventional carbon allotropies, graphite and diamond, for its metallic characteristics as plastic deformation and work hardening as noted above.

The expectation towards utility in various applications of the fullerene as a carbonaceous materials having good properties such as workability.

The study is now under way for application to such functional materials as superconducting materials, semiconducting materials, catalysts and materials for nonlinear optics based on the properties inherent in the fullerene.

However the fullerene has the disadvantage in being deficient in mechanical property because the molecules are bound by the van der Waals forces as described above.

An attempt at using the fullerene for various functional materials in place of the conventional carbonaceous materials, therefore, solves the problem in handling and finds utility with limited applications.

As described above, the fullerene molecule is distinct from conventional carbon allottopics, graphite and diamond, for its metallic characteristics as plastic deformation and work hardening. Further, the fullerene manifests such specific property as superconductivity. Thus, it is expected to find utility in such applications as are capable of making the most of these properties.

Since the fullerene such as $C_{60}$ is packed in a fcc structure by the van der Waals forces, it has the deficiency in mechanical property and this causes problems of poor handling.

In view of making the most of such inherent properties of the fullerene as plastic deformation and work hardening and, at the same time the increase of the materials made of the fullerene to promote the utilization of the fullerene. To utilize the fullerene as the materials applicable in various ways with such inherent properties as plastic deformation and work hardening, it is enthusiastically expected to promote the mechanical properties made of the fullerene represented by $C_{60}$.

SUMMARY OF THE INVENTION

An object of this invention, therefore, is to provide a fullercue composite which has an improved mechanical strength in addition to the inherent properties of the fullerene such as plastic deformation and work hardening, and which has been consequently endowed with wide variety of applicability as functional materials.

The fullershe composite of this invention is characterized by comprising a matrix formed substantially of ultrafine fullerene particles of 5 to 50 nm in diameters and a reinforcing member formed substantially of a mixture of carbon nanotubes, carbon nanocapsules, and inevitable indeterminate carbonaceous impurities incorporated with the matrix in a proportion in the range of from 15 to 45 wt % based on the amount of the matrix.

In the fullerene composite of this invention, the matrix formed substantially of ultrafine plastically deformable fullerene particles has compounded therein the reinforcing member formed substantially of a mixture of carbon nanotubes, carbon nanocapsules, and inevitable indeterminate carbonaceous impurities. In the components of the reinforcing member, the carbon nanotubes are unusually stable thermally and chemically and, because of the cylindrical carbon structure and the absence of dislocation and defect, are excellent in mechanical strength. In contrast, the carbon nanocapsules bring about the dislocation pinning effect by dispersion. Owing to the use of the reinforcing member which contains these carbon nanotubes and carbon nanocapsules, the matrix which is formed substantially of ultrafine fullerene particles is enabled to acquire markedly improved tensile strength, elongation, and resistance to deformation. Further, since the carbon nanotubes themselves are capable of plastic deformation, they enable the composite as a reinforcing material to acquire notably improved tensile strength as compared with carbon fibers in popular use. If the reinforcing member is formed solely of carbon nanotubes, for example, the composite to be produced will offer only low resistance to deformation and will be deformed with low stress value.

DESCRIPTION OF THE PREFERRED EMBODIMENTS

This invention will bedescribed more specifically below with reference to working examples.

Figure 1:
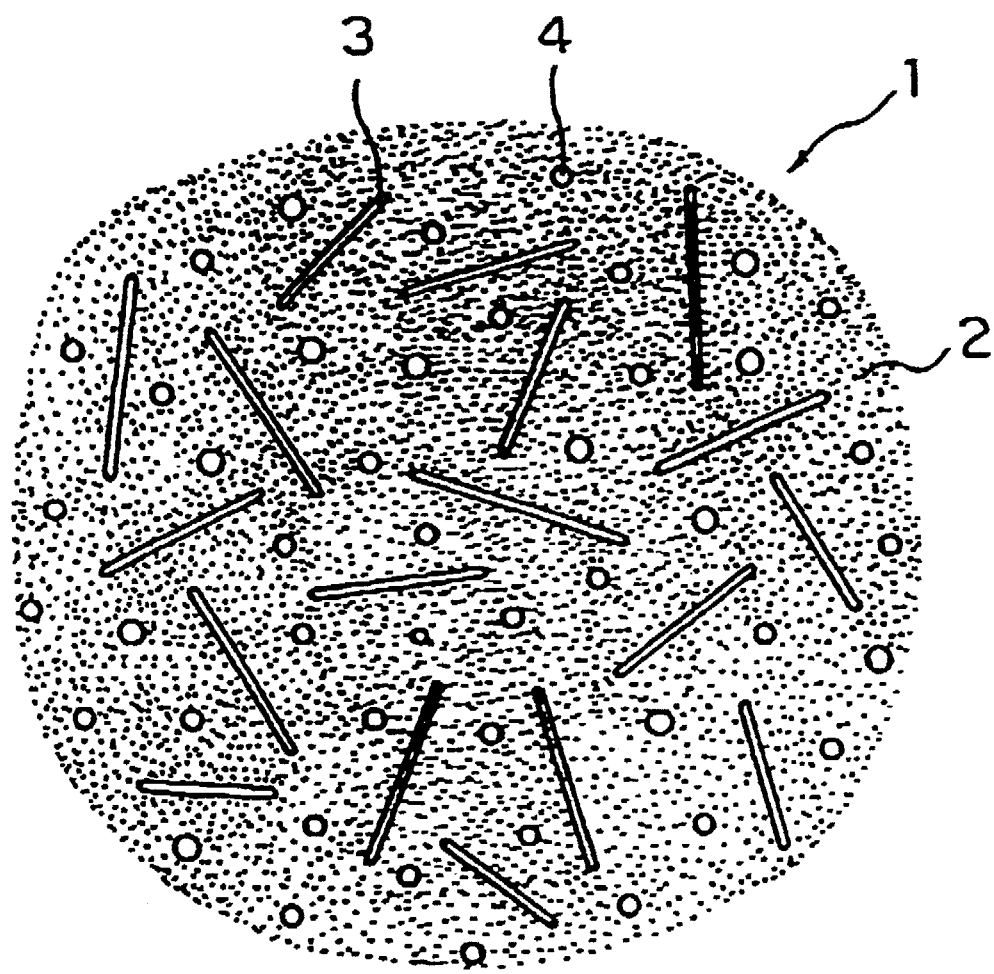
FIG. 1 is a diagram showing with a model the microstructure of a fullerene composite of this invention.

FIG. 1 is a diagram showing with a model the microstructure of a fullerene composite of this invention. A fullerene composite 1 shown in this diagram has fine fullerene particles 2 as a matrix thereof. The ultrafine fullerene particles 2 which form the matrix of this fullerene composite 1 of 5 to 50 nm in diameter. Owing to the use of these ultrafine fullerene particles 2 as the matrix, the fullerene composite 1 is vested with the ability to yield to plastic deformation. As a result, they contribute to improve the tensile strength of the fullerene composite 1. If the diameter of the ultrafine fullerene particles 2 is less than 5 nm, the produced fullerene composite 1 will not acquire sufficient strength. Conversely, if the diameter exceeds 50 nm, the ultrafine fullerene particles 2 will not be fully effective in imparting the ability of plastic deformation to the fullerene composite 1.

As fullerene materials, $C_{60}$, $C_{70}$, $C_{76}$, $C_{78}$, $C_{82}$, and $C_{84}$ have been known. For the ultrafine fullerene particles 2, the $C_{60}$ is ideally adapted. This invention does not exclude the use of any of the other fullerene mentioned above. Depending on the purpose for which the composite is used, this invention allows use of a mixture of the $C_{60}$ with other fullerene. As concrete examples of the form of the matrix of the ultrafine fullerene particles 2, compression molded pieces and hot-pressed pieces may be cited.

The matrix which is formed of the ultrafine fullerene particles 2 as mentioned above has compounded therein a reinforcing member containing carbon nanotubes 3 and carbon nanocapsules 4. These carbon nanotubes 3 and carbon nanocapsules 4 are distributed substantially uniformly throughout the entirety of ultrafine fullerene particles 2. For the reinforcing member, a mixture which comprises the carbon nanotubes 3 and carbon nanocapsules 4 mentioned above and inevitable indeterminate carbonaceous impurities are included. The proportions of the carbon nanotubes, carbon nanocapsules, and inevitable indeterminate carbonaceous impurities contained in the reinforcing member are desired to be set so that the weight ratio of the carbon nanotubes may be in the range of from 30 to 90%. If the weight ratio of the carbon nanotubes is less than 30% or not less than 90%, the possibility will arise that the reinforcing member is not fully effective in improving the mechanical strength of the produced fullerene composite.

The carbon nanotubes 3 are giant fullerenes with a hollow cylindrical structure (helical arrangement) which are formed in the cathode piled mass formed through the production of fullerene by arc discharge. The cylindrical structure with the absence of dislocation and defect causes extreme stabilities both in thermally and chemically, and exhibits outstanding mechanical strength. Further, since the carbon nanotubes in themselves possess the ability of plastic deformation, they manifest an excellent effect in enhancing the tensile/compressive strength of the produced fullerene composite as compared with carbon fibers in popular use. To produce the effect of improving the strength sufficiently for a reinforcing member, the carbon nanotubes 3 are desired to have a diameter in the range of from 2 to 60 nm and a length in the range of from 0.5 to 5 μm.

The carbon nanocapsules 4 are giant fullerenes with a spherical basket structure which are formed in the piled mass of a cathode during the production of fullerene by arc discharge. The carbon nanocapsules 4 of this quality bring about the dislocation pinning effect by dispersion. To manifest the particle dispersing effects to the best advantage, the carbon nanocapsules are desired to have a diameter in the range of from 50 to 200 nm.

The reinforcing member which contains such carbon nanotubes 3 and carbon nanocapsules 4 as described above is desired to be compounded in such an amount with the ultrafine fullerene particles 2 of matrix that the amount of the mixture thereof plus the inevitable indeterminate carbonaceous impurities may be in the range of from 15 to 45 wt %. Remarkable importance for the fullerene composite 1 of this invention is the amount of the reinforcing member be in the proper range mentioned above. If the amount of the reinforcing member to be incorporated is less than 15 wt %, the effect of compounding will not be obtained sufficiently. Conversely, if this amount exceeds 45 wt %, the composite of practical utility will not be obtained because the inherent properties of the ultrafine fullerene particles 2 are degraded and the compression moldability of the ultrafine fullerene particles 2 is impaired. For the effect of compounding to be manifested to better advantage, the amount of the reinforcing member to be incorporated is desired to be in the range of from 20 to 40 wt %.

Since the fullerene composite 1 of this invention has as the reinforcing member thereof the mixture formed mainly of the carbon nanotubes 3 and carbon nanocapsules 4 and has this mixture dispersed in the matrix which is formed of the ultrafine fullerene particles 2 as described above, it combines the dislocation pinning effect by dispersion manifested by the carbon nanocapsules 4 with the effect of improving the mechanical strength due to the particular shape and the plastic deformation manifested by the carbon nanotubes 3. These effects contribute to enhance notably the mechanical strength of compression molded articles made of the ultrafine fullerene particles 2. Owing to the use of the aforementioned mixture as the reinforcing member, the fullerene composite 1 using the ultrafine fullerene particles 2 as the matrix is enabled to acquire improved elongation and resistance to deformation in addition to the improvement of the tensile/compressive strength. If the reinforcing member is formed solely of carbon nanotubes 3, for example, the produced fullerene composite 1 will acquire only low resistance to deformation and will be readily deformed.

The fullerene composite 1 of this invention which is constructed as described above can be manufactured as follows, for example.

First to prepare ultrafine fullerene particles as $C_{60}$ particles and a mixture which contains carbon nanotubes, carbon nanocapsules, and inevitable indeterminate carbonaceous impurities in prescribed proportions.

With respect to the ultrafine fullerene particles, first a fullerene is formed by the arc discharge method using carbon rods or carbon grains as an electrode or the laser ablation method resorting to irradiation of the surface of graphite with an ultraviolet laser. Since the fullerene is formed as mixed in soot, it is extracted from the soot by a collecting device with filters and solvents such as benzene. The fullerene, when necessary, may be refined to a desired extent by means of liquid chromatography, for example. From the fullerene thus formed, the ultrafine fullerene particles can be produced by the gas evaporation method, for example. To be more specific, the ultrafine fullerene particles are obtained by evaporating the fullerene particles in a reduced-pressure atmosphere of He, for example, and causing the vapor to adhere to a cold finger cooled by liquid nitrogen.

The carbon nanotubes and carbon nanocapsules are contained in the substance which is deposited on the cathode side during the process of arc discharge. They are obtained by pulverizing the deposited substance and separating them from the pulverized powder by the use of an organic solvent such as ethanol. By this refining method, a mixture formed mainly of carbon nanotubes and carbon nanocapsules is obtained. At times, this mixture contains such impurities as graphitic substance and amorphous carbon. The presence of up to about 60% of indeterminate carbonaceous impurities in the mixture poses no particular problem for this invention. When the carbon nanotubes and carbon nanocapsules which have been refined as described above are thrown into water containing a dispersant and then subjected to centrifugation, they can be refined to a greater extent.

The extremely fine fullerene particles produced by the method described above and the reinforcing member formed of the mixture mainly containing carbon nanotubes and carbon nanocapsules in prescribed proportions are mutually dispersed thoroughly. Then, the composite material consequently formed is compression molded at room temperature to obtain the fullerene composite as aimed at. For the manufacture of the composite, the hot-pressing may be adopted, for example.

The improvement of orientation of the reinforcing member, particularly the carbon nanotubes contained therein, during the step of molding mentioned above proves advantageous for this invention. Specifically, the strength of the reinforcing member to resist the force exerted in the direction perpendicular to the direction of orientation of the carbon nanotubes can be increased markedly by raising the degree of orientation of carbon nanotubes in one fixed direction. The orientation of the carbon nanotubes can be implemented by adopting such an array method of orientation as comprises packing the composite material in a metallic tube and stretching the metallic tube, for example.

Now, concrete examples of the fullerene composite obtained by the embodiment described above and the results of the evaluation of the properties thereof will be explained below.

EXAMPLE 1

First, a carbon rod (99.999%) was arc discharged in an atmosphere of He and the soot consequently obtained was subjected to liquid chromatography to produce a refined $C_{60}$ powder. Then, the $C_{60}$ powder was evaporated in an atmosphere of He of $1.33 \times 10^3$ Pa and the vapor was deposited on a rotor cooled with liquid nitrogen. Consequently, ultrafine $C_{60}$ powder having a particle diameter of 10 to 30 nm was obtained.

The deposit formed on the cathode side during the arc discharge of the carbon rod mentioned above was pulverized. The product was refined with ethanol to obtain a mixture consisting of carbon nanotubes, carbon nanocapsules, and inevitable indeterminate carbonaceous impurities. This mixture was found to contain about 60% by weight of carbon nanotubes. The carbon nanotubes were hollow tubes having an average diameter of 10 nm and an average length of 3 μm and the carbon nanocapsules were ellipsoids having an average major diameter of 50 nm.

Then, the mixture of carbon nanotubes, carbon nanocapsules, and inevitable indeterminate carbonaceous impurities was added as a reinforcing material in an amount of 30% by weight to the ultrafine $C_{60}$ powder and dispersed therein by ultrasonic wave. Subsequently, the composite material consequently obtained was compression molded in the shape of discs 3 mm in diameter under a molding pressure of 123 MPa at room temperature in the open air. The discs were subjected to a cutting work to obtain the fullerene composite in the form of compression molded pieces (2.5×2×1 mm).

When the produced compression molded fullerene composite was observed as to the microstructure, carbon nanotubes and carbon nanocapsules were found to be uniformly dispersed therein. when the compression molded fullerene composite mentioned above was tested for tensile strength by the use of a hard beam type tensile tester (speed of tension 2.5 μm/s) at room temperature, it showed a satisfactory high tensile strength of 10 MPa.

COMPARATIVE EXAMPLE 1

A compression molded fullerene composite was manufactured by following the procedure of Example 1 while changing the amount of the mixture of carbon nanotubes, carbon nanocapsules, and inevitable indeterminate carbonaceous impurities to be added to the ultrafine $C_{60}$ powder prepared in Example 1 to 5% by weight. When this compression molded fullerence composite was tested for tensile strength in the same manner as in Example 1, it showed a low tensile strength of 0.6 MPa, a magnitude equal to that which is obtained by a compression molded mass using ultrafine $C_{60}$ powder alone.

EXAMPLE 2 THROUGH 5

Compression molded fullerene composites were manufactured by following the procedure of Example 1 while changing the mixing ratio of the ultrafine $C_{60}$ powder with the mixture of carbon nanotubes, carbon nanocapsules, and inevitable indeterminate carbonaceous impurities (the carbon nanotubes' content in the mixture shown in Table 1) as shown in Table 1. The compression molded fullerene composites were tested for tensile strength in the same manner as in Example 1. The results are also shown in Table 1.

TABLE 1

|  | Amount of carbon nanotubes in reinforcing member (wt %) | Amount of reinforcing member incorporated (wt %) | Tensile strength (MPa) |
| --- | --- | --- | --- |
| Example 2 | 35 | 20 | 5 |
| Example 3 | 50 | 30 | 10 |
| Example 4 | 40 | 40 | 10 |
| Example 5 | 25 | 40 | 6 |

The difference in tensile strength between the compression molded fullerene composite according to Example 4 and the compression molded fullerene composite according to Example 5 is thought to originate in the difference in percentage composition of the components of the reinforcing member.

Figure 2:
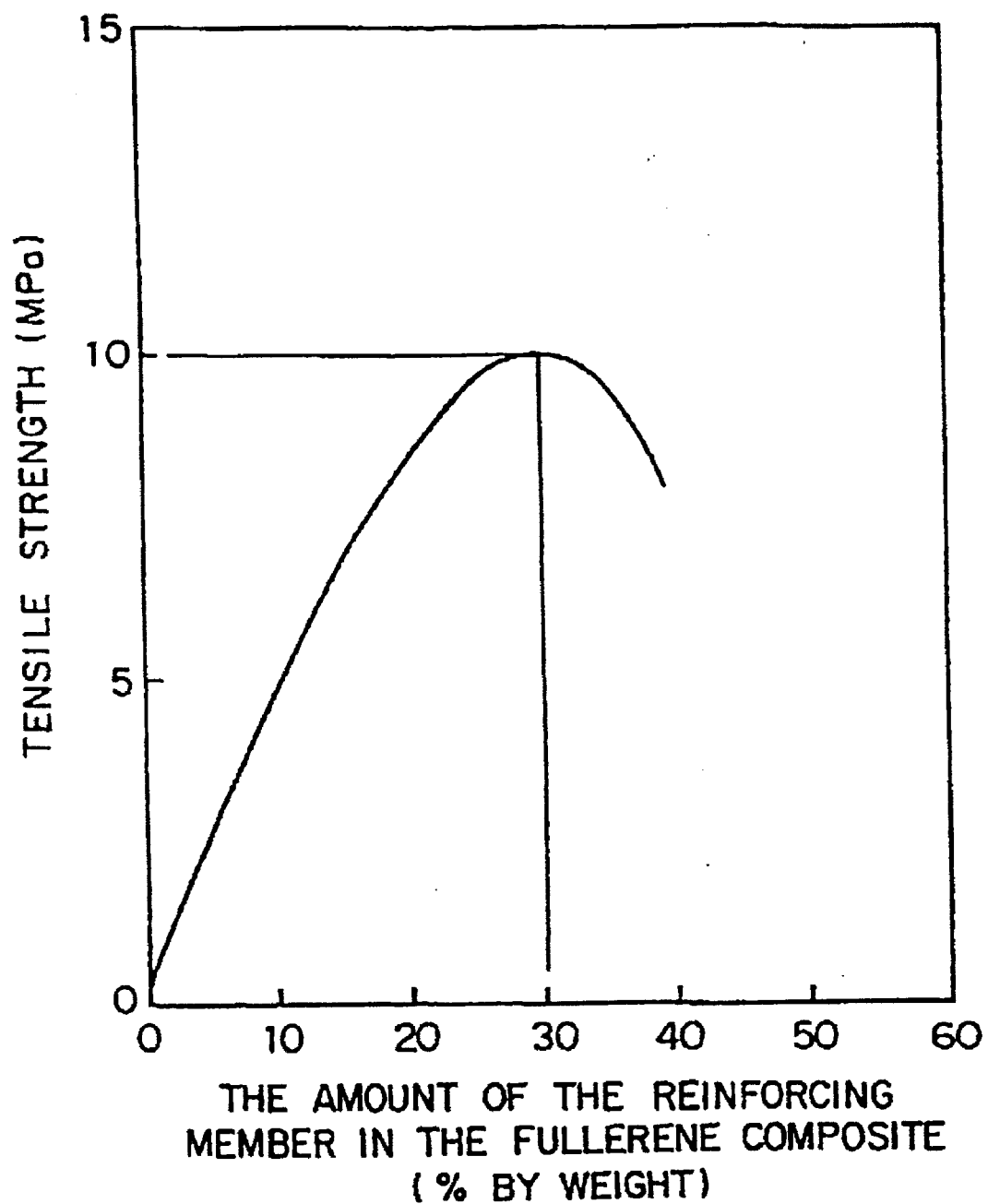
FIG. 2 is a diagram showing the relation between the amount of the reinforcing member in the fullerene composite of this invention and the tensile strength of the composite.

FIG. 2 shows the relation between the amount of reinforcing member in the compression molded fullerene composite and the tensile strength of the composite. The results of tensile strength shown in FIG. 2 are those obtained by using mixtures containing carbon nanotubes in a fixed ratio of 50% by weight. It is clearly noted from this diagram that when the mixture of carbon nanotubes, carbon nanocapsules, and inevitable indeterminate carbonaceous impurities are compounded in an amount in the range of from 15 to 45% by weight with the ultrafine fullerene particles, the produced fullerene composite acquires highly satisfactory strength and the functional materials using the fullerene particles acquire markedly improved practical utility.

EXAMPLE 6

The ultrafine $C_{60}$ powder and the mixture of carbon nanotubes, carbon nanocapsules, and inevitable indeterminate carbonaceous impurities prepared in Example 1 were compounded at the same ratio as in Example 1. The composite material obtained consequently was sealed in an Ag tube 8 mm of outer diameter, 6 mm of inner diameter, and 150 mm in length. This Ag tube was swaged, rolled, and drawn until an outer diameter of 0.5 mm. Then, the drawn line was stripped off the Ag tube to obtain a molded fullerene composite having carbon nanotubes oriented in the direction of line drawing. When this molded fullerene composite was tested for tensile strength in the same manner as in Example 1, it showed satisfactory high tensile strength of 15 MPa.

As demonstrated by the working examples cited above, the fullerene composite of this invention enjoys practical strength and resistance to deformation in addition to such metallic properties as plastic deformation and work hardening and such specific properties as superconductivity are inherent in the fullerene such as $C_{60}$. When the fullerene composite of this invention is utilized in functional materials by making the most of the various properties of the fullerene, therefore, it contributes to impart markedly enhanced handling property to the materials. Thus, the present invention widens the range of applications in which the fullerene is advantageously used.

What is claimed is:

1. A fullerene composite comprising:

a matrix predominantly consisting essentially of ultrafine fullerene particles having diameters in the range of from 5 to 50 nm, and reinforcement composed of carbon nanotubes having diameters in the range of from 2 to 60 nm and lengths in the range of from 0.5 to 5 μm, carbon nanocapsules having diameters in the range of from 50 to 200 nm, and inevitable carbonaceous impurities, said reinforcement being dispersed in said matrix in the range of from 15 to 45% by weight for 100% by weight of said matrix, wherein said composite is a compressed mixture of said ultrafine fullerene particles and said reinforcement.

2. The fullerene composite according to claim 1, wherein said ultrafine fullerene particles consist essentially of $C_{60}$ molecules.

3. The fullerene composite according to claim 1, wherein said reinforcement contains said carbon nanotubes in the range of from 30 to 90% by weight.

4. The fullerene composite according to claim 1, wherein said carbon nanotubes and carbon nanocapsules are uniformly dispersed in said matrix.

5. The fullerene composite according to claim 1, wherein said composite is a compression molded mixture of said ultrafine fullerene particles and said reinforcement.

6. The fullerene composite according to claim 1, wherein said carbon nanotubes are oriented in substantially the same direction in said matrix.

7. The fullerene composite according to claim 1, wherein said ultrafine fullerene particles are composed of $C_{60}$ molecules and at least one which is selected from $C_{70}$, $C_{76}$, $C_{78}$, $C_{82}$, and $C_{84}$ molecules.

* * * * *